United States Patent

[11] 3,556,444

| [72] | Inventor | Gerhard Kopp<br>Munich, Germany |
|---|---|---|
| [21] | Appl. No. | 791,707 |
| [22] | Filed | Jan. 16, 1969 |
| [45] | Patented | Jan. 19, 1971 |
| [73] | Assignee | Entwicklungsring Sud GmbH<br>Munich, Germany |
| [32] | Priority | Feb. 2, 1968 |
| [33] | | Germany |
| [31] | | 1,556,422 |

[54] APPARATUS FOR THE DISPOSAL OF AIRCRAFT ENGINE LEAKAGE FLUIDS
10 Claims, 8 Drawing Figs.

[52] U.S. Cl. .................................................... 244/135,
222/108, 60/39.09
[51] Int. Cl. ............................................... B64d 37/32
[50] Field of Search........................................... 244/135,
53, 54, 55, 239; 222/108; 60/39.09

[56] References Cited
UNITED STATES PATENTS

| 2,128,266 | 8/1938 | Quinn............................ | 244/99 |
| 2,138,970 | 12/1938 | Jones............................ | 244/135 |
| 2,283,502 | 5/1942 | Hughes et al. ................. | 244/135 |
| 2,949,736 | 8/1960 | Rubbra......................... | 60/39.09(X) |

*Primary Examiner*—Milton Buchler
*Assistant Examiner*—James E. Pittenger
*Attorney*—William K. Serp and John J. Byme

ABSTRACT: The invention relates to an apparatus for controlling the discharge of leakage fluids from the jet engines of an aircraft. The apparatus includes a storage tank for receiving the leakage fluids from the engine. Adjacent the discharge orifice of the storage tank is a control valve actuated by a switch responsive to the flow of air about the fuselage. Means are included for pumping the leakage fluids from the tank in response to an open condition of the valve. The fluids removed from the tank are directed into the exhaust jet of the engines for combustion.

PATENTED JAN 19 1971

APPARATUS FOR THE DISPOSAL OF AIRCRAFT ENGINE LEAKAGE FLUIDS

BACKGROUND OF THE INVENTION

This invention generally relates to an apparatus for disposing of the leakage fluids from the engines of vertical takeoff (VTOL) and short takeoff (STOL) aircraft.

With respect to conventional aircraft wherein the takeoff and landing occurs in the conventional horizontal manner, the overflow oil and any leakage fuel is passed into the free atmosphere by means of discharge lines located at the bottom of the fuselage. Alternatively, such excess liquids are passed into the exhaust jet of the propulsion engines.

Such discharge arrangements are not suitable for VTOL/STOL aircraft since the oil and fuel residues leaving at the bottom of the fuselage may be ignited by the exhaust gas from the vertical lift propulsion engines. During takeoff and landing the exhaust of the propulsion engines is in a downward direction to produce a vertical lift upon the aircraft. The escape of such leakage fluids at the tail of the craft during takeoff operations and landing is not advisable. Arrangements for preventing the recirculation of the expended fluids are not totally acceptable since the discharge of a combustible mixture from the aircraft during takeoff and landing is objectionable. The discharge of such mixtures will endanger ground personnel and any instruments located near the takeoff sight. Additionally, such fluid discharge may result in excessive ground erosion. Further, the residue mixtures upon the ground reduce the friction between the aircraft and the runway making future takeoff and landing operations more complicated and dangerous.

A main object of the present invention is to provide an apparatus for preventing the leakage of excess fluids during the takeoff and landing of VTOL/STOL aircraft. The illustrated embodiment accomplishes this end by including a fluid container which is provided with an aerodynamically controlled discharge valve. Upon activation of the valve, the container is drained. Valve activation occurs when the aircraft has attained a predetermined horizontal cruise speed. Once this cruise speed is reached, all of the leakage fluids are released from the container and are burnt in the exhaust gas jet. The control valve, in accordance with the illustrated embodiment, is actuated by means of a pneumatically controlled vane which is adjustable for operation at selected air speeds. The illustrated embodiment of this invention includes a pressure sensitive valve or membrane operatively connected to a drain control valve. The membrane is located adjacent the outer surface of the aircraft. Actuation of the pressure membrane controls the operation of an electric drive.

According to an alternative embodiment, a jet pump, which includes a pilot tube, is connected in the direction of normal fluid flow after the control valve. The jet pump produces a pressure which, during horizontal flight, is used to blow the leakage fluids into the channel of the exhaust gas jet to facilitate combustion.

In still another alternate embodiment, the drain control valve and the jet pump are replaced by an electrically driven feed pump which is switched on by the pressure sensitive membrane. The feed pump serves to blow the leakage fluids into the gas jet.

According to an illustrated embodiment of the invention, directional flow means are included to prevent fluid flow through the system in the reverse direction. A complete aircraft discharge system may include one or more flow control means, collecting tanks, contact valves, delivery pipes and nonreturn valves. Each of these parallel discharge systems may be operated in unison or independently. The preferred embodiment described includes a mechanical flow control means and an alternate embodiment includes an electric control blocking means for controlling the flow of the leakage fluids.

DESCRIPTION OF THE ILLUSTRATED EMBODIMENTS

Figure 1:
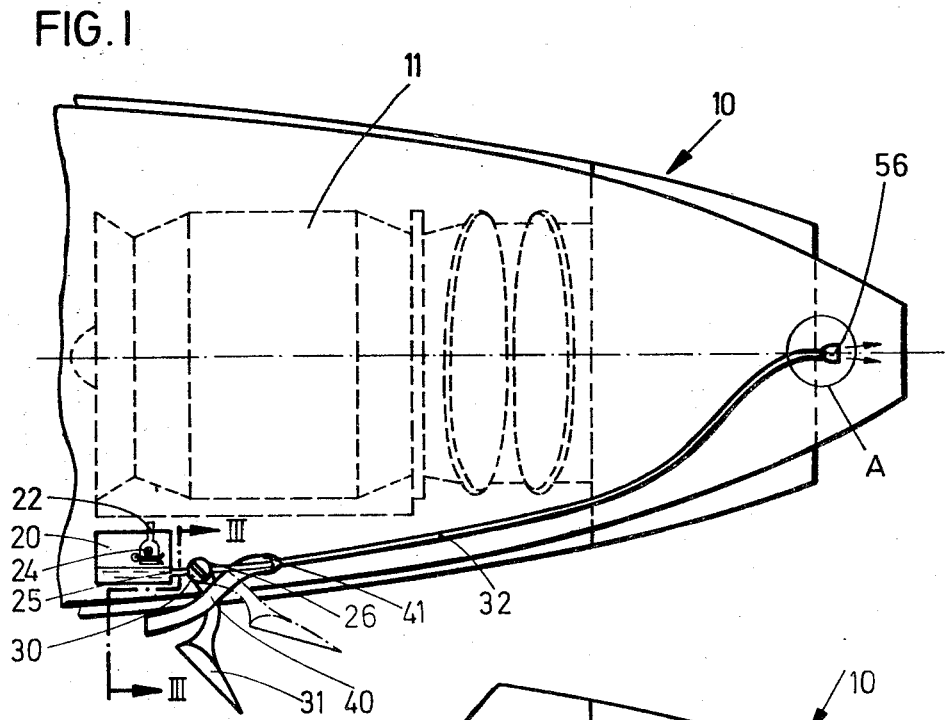
FIG. 1 is a partial section along the line I-I of FIG. 2, illustrating a portion of an aircraft including certain features of this invention.
Figure 2:
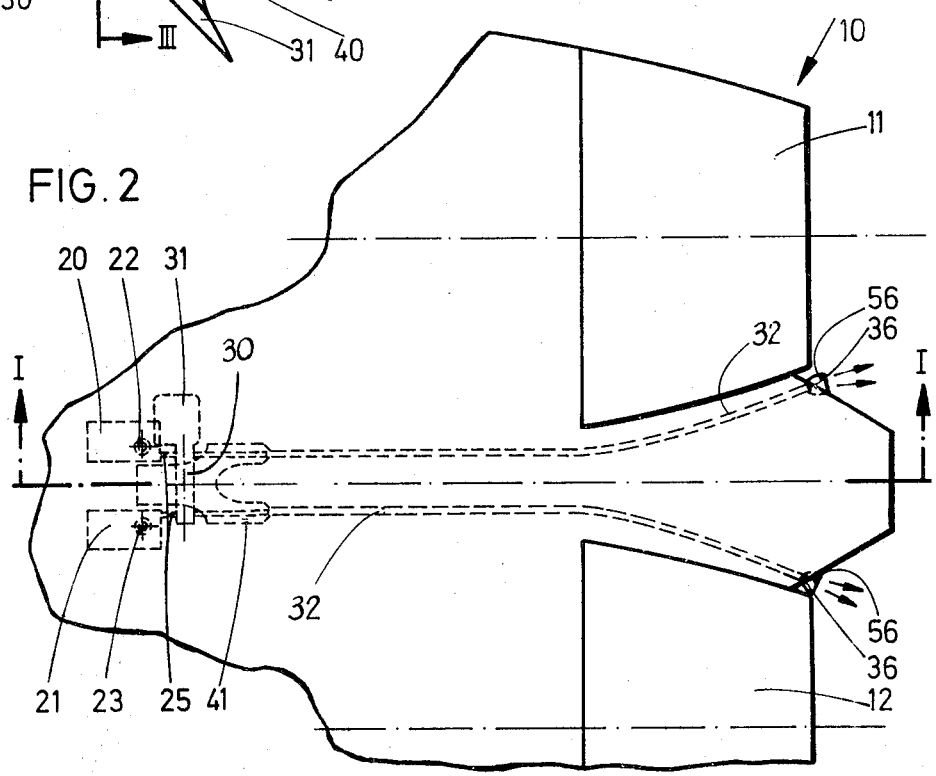
FIG. 2 is a plan view of a portion of an aircraft including certain features of this invention.
Figure 3:
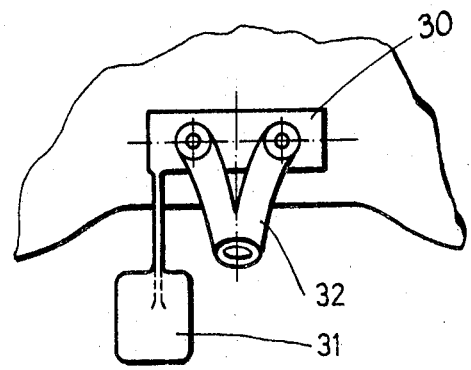
FIG. 3 is a partial sectional view taken along line III-III of FIG. 1.

Within the tail section 10 of the aircraft a pair of engines 11 and 12 are maintained. Associated with each of the engines 11 and 12 are respectively collecting tanks 20 and 21 to which are connected input collecting ducts 22 and 23 respectively. Each of the ducts 22 and 23 are equipped with a directional flow valve 24 which, during inverted flight, serves to prevent the contents of the tanks from flowing back out through the ducts 22 and 23. Connecting the tanks to a shutoff valve is a discharge tube 25. With respect to FIGS. 1 to 3 the valve 30 includes an air vane 31. The position of the air vane 31 is determined by the air flow around the fuselage during horizontal flight. When a preselected velocity is attained the valve 30 will connect the tank to the discharge pipes 26 and 32 thus allowing the leakage fluids collected in the tank 20 to discharge. Adjacent the shutoff valve 30 surrounding the discharge pipe 26 is a jet pilot tube 40 including a jet pump 41. The pilot tube, due to the pressure of the streaming air, blows the leakage fluid through the pipe 32 into the exhaust jet of the engines 11 and 12 which results in the combustion of the waste materials.

Figure 4:
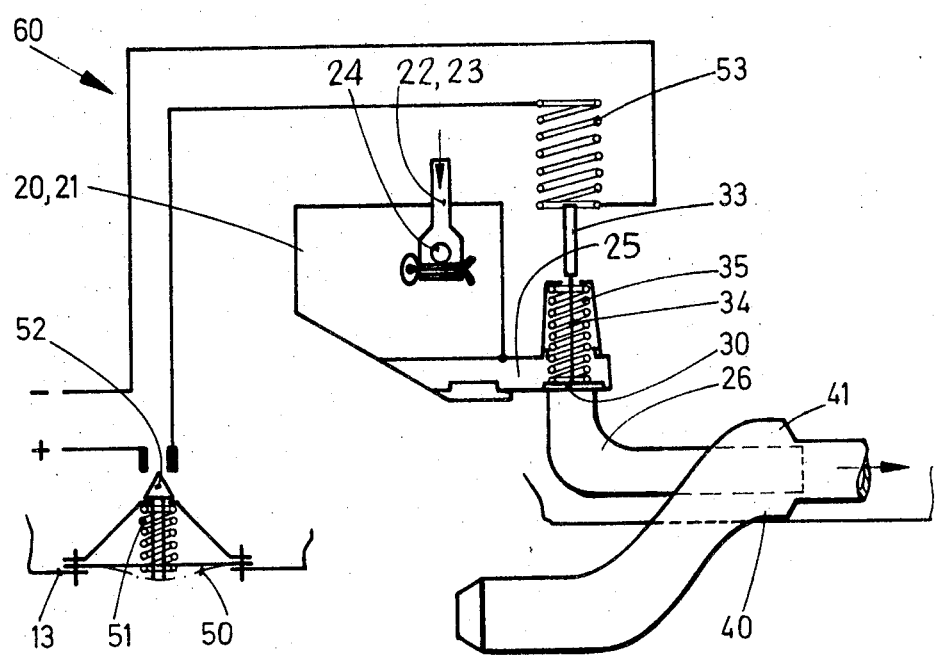
FIG. 4 is a diagrammatic illustration of an alternate embodiment of this invention.

With respect to the embodiment of FIG. 4, each of the individual components are electrically actuated. A membrane 50, which is spring biased, is mounted adjacent the outer si skin of the aircraft and is exposed to the airflow about the aircraft through a suitable opening.

During periods of rest, takeoff, or landing the force of the spring 51 is greater than the external pressure which results in the interruption of the electrical circuit 60 and correspondingly closes the shutoff control valve 30. During cruise flight at a predetermined velocity, a positive overpressure results which causes the spring biased membrane 50 to move inwardly resulting in closure of the contact switch 52. The circuit energizes an induction coil 53 which forms part of a solenoid. The magnetic field of the coil 53 pulls the iron core 33 and the shaft 34 of the shutoff valve 30, against the bias of a spring 35, in the field of the induction coil 53. In this manner, the shutoff valve 30 is opened and as the leakage fluid passes through the duct 26 it is blown by the jet pump 41 into the exhaust of the engine. The jet pump 41 is driven by an external pressure source (not shown).

Figure 5:
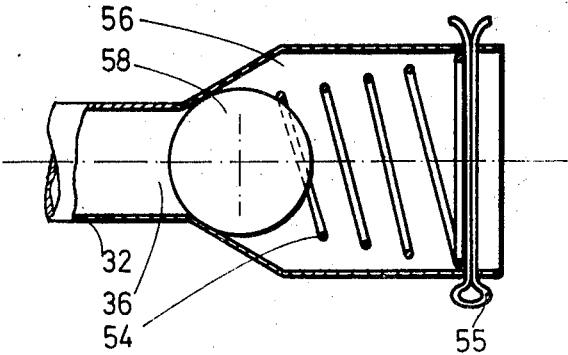
FIG. 5 is an enlarged half-sectional view of detail A of FIG. 1.
Figure 6:
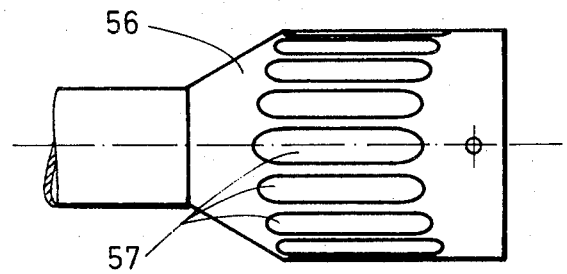
FIG. 6 is a plan view of detail A of FIG. 5.

The discharge pipe 32, which is between the jet nozzles of the engines 11 and 12, is frequently coated with a film of combustible liquid. Thus, when the engines are idling while the aircraft is at rest upon the ground a fire hazard may be present. Each of the pipes is equipped with a directional control flow valve 56 particularly illustrated in FIGS. 5 and 6. The terminal end of the discharge pipe 32 is enlarged and provided with a plurality of atomizing slits 57. A ball 58 located within the enlarged end of the pipe 32 is urged by a spring 54 against the opening 36 of the pipe. The spring 54 is maintained in position by a cotter pin 55. A flow control valve 56 is thus provided which opens to permit the flow of fluid through the discharge pipe 32 when the pressure created by the jet pump 41 is greater than the biasing pressure of the spring 54. By this means reverse flow is prevented.

Figure 7:
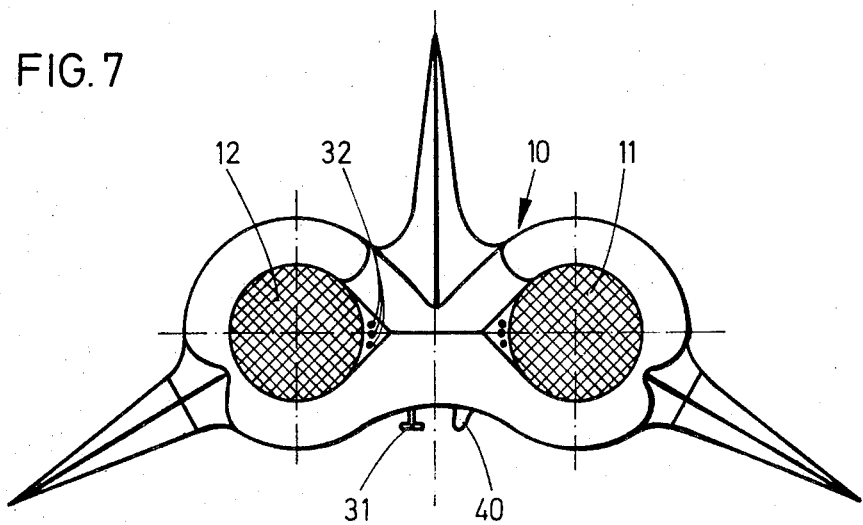
FIG. 7 is a view of the aircraft illustrated in FIG. 2.

FIG. 7 is an a end view of the aircraft illustrating the arrangement of multiple discharge pipes 32. Each of the discharge pipes is connected to one of the collecting tanks 20 or 21, respectively, by means of the ducts 22 or 23. A directional flow valve 24 and a shutoff control valve 30 as well as a nonreturn valve 56 at the pipe outlet 36 are included. In accordance with the illustrated embodiment each of the units have a common actuating means, which include an air vane 31, a membrane 50 or a similar operating means for a common and simultaneous actuation of the shutoff control valves 30.

Figure 8:
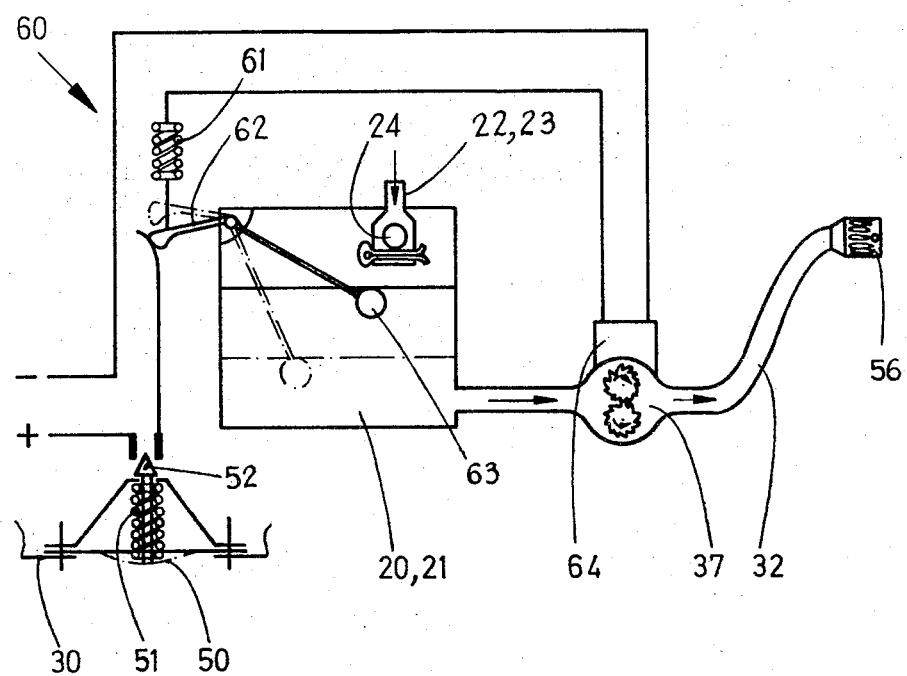
FIG. 8 is a diagrammatic illustration of an alternate embodiment of the control apparatus.

With reference to the alternate embodiment illustrated in FIG. 8, a means is included for pumping the leakage fluids from the storage tank by an electrically actuated pump 37 into the exhaust-gas jet through the pipe 32. The pump 37 is activated as determined by the membrane 50 operative through the electric circuit 60. The pump is actuated by the switch 64 only when a predetermined minimum amount of leakage fluid is present in the tank. This feature is included so that the delivery pump 37 will not produce a negative pressure within the tank which would promote the leakage of fluids from the engines 11 or 12. Serving this end, a liquid level sensing switch is connected in series with the membrane switch 52 and the pump 64. The level switch includes a contact 62 which is biased by means of a spring 61 against the weight of a float 63.

Although several preferred embodiments of the invention have been described in detail, it is to be understood that various changes, substitutions and alterations can be made without departing from the spirit and scope of the invention.

I claim:

1. An apparatus for controlling the leakage of fluids from the jet engines of an aircraft comprising a storage tank for receiving said leakage fluids from the engines of the aircraft, said storage tank defining an outlet orifice, an aerodynamically operated control means connected to said tank adjacent said outlet orifice serving to control the flow of fluids therefrom and a discharge pipe connected to said control means for directing said fluids from said tank to the exhaust jet of the engines as determined by the operational condition of said control means.

2. The apparatus of claim 1 wherein said control means includes a shutoff valve and an adjustable airflow sensing means positioned to sense the air velocity about the fuselage of the aircraft so as to actuate said shutoff valve from a closed to an open position when the air velocity about said fuselage reaches a predetermined value.

3. The apparatus of claim 2 which further comprises a jet pump pitot and a tube connected between said control valve and the exhaust end of said pipe and which serves to promote the removal of leakage fluids from said tank in response to the open condition of said valve.

4. The apparatus of claim 3 which further comprises a directional flow control means located at the discharge end of said pipe.

5. The apparatus of claim 4 which further comprises a directional flow control means for controlling the direction of fluid flow between the engines and said tank so as to prevent reverse flow therethrough.

6. The apparatus of claim 1 wherein said control means includes a fluid pump and an adjustable air flow sensing means positioned for exposure to the air flow about the fuselage of the aircraft, said sensing means actuating said pump when a predetermined air velocity is attained.

7. The apparatus of claim 6 which further comprises a directional flow control means located at the discharge end of said pipe.

8. The apparatus of claim 7 which further comprises a directional flow control means for controlling the direction of fluid flow between the engines and said tank so as to prevent reverse flow therethrough.

9. The apparatus of claim 1 which further includes a level sensing means for sensing the fluid level within said tank so as to prevent actuation of said control means in the event the fluid level within the tank falls below a predetermined level.

10. The apparatus of claim 1 wherein said tank defines a plurality of outlet orifices, a plurality of said control means each of which is connected to said tank adjacent one of said orifices, a plurality of discharge pipes each of which is connected to one of said control means and aerodynamically sensitive means for simultaneously operating each of said control means in response to the air speed of the aircraft.